United States Patent Office 3,354,170
Patented Nov. 21, 1967

3,354,170
ARYLSELENAZOLE CHEMICAL SYNTHESES
Alan E. Rosenoff, Framingham, Mass., assignor to Polaroid Corporation, Cambridge, Mass., a corporation of Delaware
No Drawing. Filed Nov. 12, 1963, Ser. No. 323,046
2 Claims. (Cl. 260—298)

This application is a continuation-in-part of application Ser. No. 226,459, filed Sept. 26, 1962, now abandoned.

This invention relates to chemistry and more particularly to novel chemical syntheses.

A principal object of the present invention is to provide novel methods for the preparation of certain compounds set forth hereinafter.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

In photographic processes, certain cyanine dyes are known to exhibit superior characteristics as spectral (optical) sensitizing agents. These cyanine dyes are of the formula:

(I)
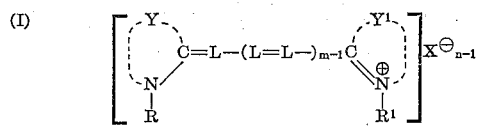

wherein L represents a methine group such as —CH=, —C(CH$_3$)=, etc., groups; each of R and R$^1$ may be the same or different and each represents an alkyl group such as methyl, ethyl, n-propyl, isobutyl, n-butyl, allyl, β-methallyl, β-methoxyethyl, β-ethoxyethyl, β-hydroxyethyl, β-hydroxypropyl, γ-hydroxyethyl, benzyl, β-phenethyl, carboxymethyl, α-carboxyethyl, β-carboxyethyl, γ-carboxypropyl, δ-carboxybutyl, β-sulfoethyl, γ-sulfopropyl, δ-sulfobutyl, γ-sulfobutyl, p-sulfobenzyl, carbmethoxymethyl, β-carbmethoxyethyl, carbethoxymethyl, β-carbethoxyethyl, etc., preferably containing not more than 5 carbon atoms; each of Y and Y$^1$ may be the same or different and each represents the atoms necessary to complete a heterocyclic ring system of the benzoselenazole or naphthoselenazole series; m represents a positive integer of from 1 to 3, inclusive; n represents a positive integer of from 1 to 2, inclusive; and X represents an anion.

Cyanine dyes corresponding to the above formula have been prepared by diazotizing an ortho-nitroaniline or ortho-nitronaphthylamine; reacting the thus-prepared diazonium salt with an alkali metal selenocyanate, hydrolyzing and reducing the thus-prepared ortho-nitroarylselenocyanate; oxidizing the thus-prepared ortho-aminoarylselenol; converting the thus-prepared bis(o-aminoaryl) diselenide to a corresponding 2-alkylarylselenazole; quaternizing the N atom of said selenazole, and condensing the resulting 2-alkylarylselenazole quaternary salt to provide compounds of Formula I.

It has been the practice in the past to convert the bis(o-aminoaryl) diselenide to the corresponding 2-alkylarylselenazole by reacting a reducing agent, such as zinc, and an acid anhydride, such as acetic anhydride, with the bis(o-aminoaryl) diselenide. In this method, however, it is necessary to apply heat to the reaction mixture in order to effect the production of the desired selenazole. As a result, degradation of the heat-sensitive selenazole is an inevitable consequence, leading ultimately to products having brown to black discoloration. In addition to reduced yield, considerable effort must be expended to purify such products before they are suitable for use in the preparation of spectral sensitizing agents.

As an alternative method the zinc salt of the o-aminoselenol may first be prepared and reacted, in turn, with an acid halide or anhydride. However, such a procedure yields not one, but a mixture of three compounds having the following formulae:

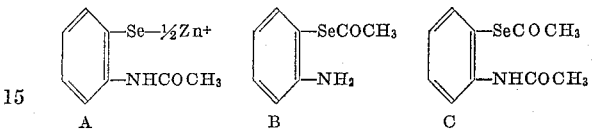

A          B          C

Only Compound A is desirable, inasmuch as this is the only one which will ring-close to the selenazole at room temperature. Compounds B and C require the addition of heat which will tend to destroy the resulting selenazole.

It has now been found that if the bis(o-aminoaryl) diselenide is converted to the corresponding selenazole at reduced temperatures, yields of 80 to 85% of product can ultimately be recovered, said product being substantially free of degraded material as evidenced by the lack of color. In accordance with the present method, the bis(o-aminoaryl) diselenide is dissolved in a suitable polar solvent, such as acetic acid or a lower molecular weight ketone such as acetone. The dispersion formed thereby is chilled thoroughly. The precise temperature is not critical; where a solvent such as acetic acid is used, the lower temperature limit is imposed by the solvent freezing point. The main consideration with regard to temperature is that the higher the temperature, the greater the tendency of the selenazole to decompose. Highly satisfactory results may be obtained by employing temperatures of about 10° C. or less.

Thereafter, an acid halide such as acetyl chloride is gradually added to the dispersion. It is important to observe carefully the temperature of the reaction mixture during this addition. When addition of the acid halide is under way, a rise in temperature will be noted. As soon as the temperature has increased beyond a desired point, 5° above the selected working temperature for example, the addition of the acid halide should be discontinued while the reaction mixture is chilled to its original temperature. Thereafter, addition is resumed until the reaction is complete, as evidenced by the cessation of temperature change.

By the aforementioned step, the bis(o-aminoaryl) diselenide is converted to bis(o-N-acylaminoaryl) diselenide; this material is then reduced with a suitable reducing agent, e.g., tin, zinc, etc., to form the 2-alkylarylselenazole. For optimum results, the reducing agent should be gradually added, with chilling, by the same procedure used for the addition of the acylating agent. Again, completion of the reduction reaction is determined by the cessation of temperature rise.

The final cyanine dyes are obtained by quaternizing the N atom of the thus-prepared 2-alkylarylselenazole by contact with a halogenated fatty acid and then:

(1) Directly condensing, in the presence of a base, the thus-prepared 2-alkylarylselenazole quaternary salt with a 2-(alkylthio)- or 2-(arylthio)-selenazole quaternary salt which may be prepared by following the methods recited in Brooker et al., U.S. Patent 2,117,936, issued May 17, 1938, and in Gabriello Illuminati and Henry Gilman, "The Reactions of Thiols With Some Alkyl and Aryl Heterocyclic Ethers," JACS, 71, p. 3349 (1949), to provide compounds of the Formula I wherein m=1. The resulting cyanine dyes are either symmetrical or unsymmetrical, depending upon the choice of the latter selenazole;

(2) Condensing, in the presence of a base, the thus-prepared 2-alkylarylselenazole quaternary salt with an ester of an orthocarboxylic acid to provide the compounds of Formula I wherein $m=2$; R and $R^1$ are identical; and Y and $Y^1$ are identical;

(3) Condensing, in the presence of a base, the thus-prepared 2-alkylarylselenazole quaternary salt with N,N-diphenylformamidine, to provide the 2-acetanilidovinyl arylselenazole quaternary salt or, in the absence of a base, with an ester of an orthocarboxylic acid to provide the 2-alkoxyvinyl arylselenazole quaternary salt which products may then be directly condensed, in the absence of a base, with a second 2-alkylarylselenazole methylene base wherein the alkyl substituent on the nitrogen atom and/or the benzoselenazole or naphthoselenazole heterocyclic ring system is different, to provide compounds of Formula I wherein $m=2$ and R and $R^1$ and Y and $Y^1$ are different;

(4) Condensing, in the presence of a base, the thus-prepared 2-alkylarylselenazole quaternary salt with a β-arylamino-acrolein anil, or a 1,1,3,3-tetraalkoxypropane, or a 1,3,3-trialkoxy-1-propene, to provide compounds of Formula I wherein $m=3$; R and $R^1$ are identical; and Y and $Y^1$ are identical; or (5) Condensing, in the absence of a base, the thus-prepared 2-alkylarylselenazole quaternary salt with a β-arylamino-acrolein and to provide a 2-aminotetramethinearylselenazole quaternary salt, which product may then be directly condensed, in the presence of a base, with a second 2-alkylarylselenazole quaternary salt wherein the alkyl substituent on the nitrogen atom and/or the benzoselenazole or naphthoselenazole heterocyclic ring system is different, to provide compounds of Formula I wherein $m=3$; and R and $R^1$ and/or Y and $Y^1$ are different.

The heterocyclic ring systems of the formula may contain the substituents usual in cyanine dye art, for example, substituents such as lower alkyl, lower alkoxy, benzyl, phenyl, naphthyl, chloro, bromo, iodo, amino, hydroxyl, cyano, etc.

As specific examples of the heterocyclic ring systems or nuclei of the benzoselenazole and naphthoselenazole series, mention may be made of 5-chlorobenzoselenazole, 5-bromobenzoselenazole, 5-iodobenzoselenazole, 5,6-dichlorobenzoselenazole, 5,6-dibromobenzoselenazole, 5-methylbenzoselenazole, 5-ethylbenzoselenazole, 5-propyl-benzoselenazole, 5-methoxybenzoselenazole, 5-ethoxy-benzoselenazole, 5-propoxybenzoselenazole, the naphthalene analogues of the aforementioned ring systems, etc.

The anion, represented by the designation X in the formula, comprises those anionic acid radicals customary in the cyanine dye art, for example, chloride, bromide, iodide, methylsulfate, ethylsulfate, p-toluenesulfonate, benzenesulfonate, acetate, propionate, cyanate, perchlorate, etc.

Specifically, compounds of Formula I may be prepared by diazotizing, in a solution of sodium nitrite dissolved in dilute hydrochloric acid, a compound of the formula:

(II)

wherein Z represents the atoms necessary to complete an aromatic ring system of the benzene or naphthalene series, to provide a diazonium salt of the formula:

(III)

This salt is reacted with an alkali metal selenocyanate such as sodium or potassium selenocyanate, etc., to provide a selenocyanate of the formula:

(IV)
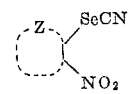

which is separated from the reaction mixture and hydrolyzed and reduced by contact with a reducing agent such as zinc in an aqueous sodium hydroxide solution, tin in a dilute hydrochloric acid solution, etc., to provide a selenol compound of the formula:

(V)
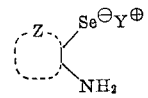

wherein $Y^\oplus$ represents a cation such as $Na^\oplus$, $H^\oplus$, $K^\oplus$, etc. The selenol is then subjected to oxidation by contact with an oxidizing agent such as hydrogen peroxide, air, oxygen, iodine, etc., to provide a diselenide of the formula:

(VI)
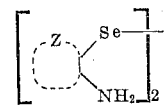

which is then separated from the reaction mixture, dissolved in a suitable solvent such as acetic acid or a low molecular weight ketone, and thoroughly chilled. An acylating agent such as acetyl chloride, propionyl chloride, butyryl chloride, benzoyl chloride, etc., is gradually added, keeping the temperature of the reaction mixture depressed, until the reaction is noted to be complete as determined by the cessation of the evolution of heat. This reaction yields a diselenide of the formula:

(VII)
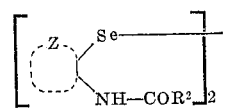

wherein $R^2$ is an alkyl group comprising from 1 to 3 carbon atoms, that is, a methyl, ethyl, or propyl group; which is then reduced by contact at decreased temperatures with a reducing agent such as zinc, tin, etc., to provide a selenazole of the formula:

(VIII)
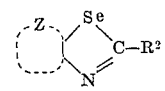

The thus-prepared selenazole is seperated from the reaction mixture and quaternized by contact with a halogenated fatty acid such as chloroacetic acid, 2-iodopropanoic acid, 3-chlorobutanoic acid, etc., and preferably bromoacids such as 2-bromopropanoic acid, 3-bromobutanoic acid, 4-bromopentanoic acid, 5-bromohexanoic acid, 6-bromoheptanoic acid, etc., preferably in the presence of heat, to provide a cycloammonium quaternary salt of the formula:

(IX)
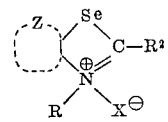

The cycloammonium quaternary salt of Formula IX may then be directly condensed by contact with a second cycloammonium quaternary salt of the formula:

(X)
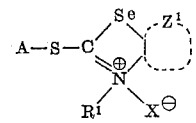

wherein A is alkyl or aryl, in the presence of a basic condensing agent such as an organic amine, for example, tri-n-propylamine, tri-n-butylamine, triisoamylamine, triethylamine, trimethylamine, dimethylaniline, diethylaniline, pyridine, N-alkyl-piperidine, etc., and most preferably an organic tertiary amine having a dissociation constant greater than pyridine ($1 \times 10^{-5}$); an alkali metal carboxylate in a carboxylic anhydride, for example, sodium acetate in acetic anhydride, etc.; or an alkali metal hydroxide, for example, sodium hydroxide, potassium hydroxide, etc.; preferably in the presence of heat and in a substantially inert reaction medium such as a lower molecular weight alcohol, for example, ethyl, n-propyl, isopropyl, n-butyl, or isobutyl alcohol; tricresylphosphate; or a phenol; or a reaction medium itself comprising the condensating agent such as pyridine, to provide monomethine compounds of Formula I wherein $m$ is the integer 1; and each of R and $R^1$ and Y and $Y^1$ may be the same or different.

For the preparation of symmetrical trimethine compounds of Formula I wherein $m=2$, R and $R^1$ are identical, and Y and $Y^1$ are identical, a cycloammonium quaternary salt of Formula IX is condensed with an ester of an orthocarboxylic acid having the formula $$R^1-C(OR)_3$$

wherein $R^1$ may be hydrogen, lower alkyl or aryl and R may be lower alkyl, for example, triethyl orthoformate, tri-n-propyl orthoformate, triethyl orthoacetate, tri-n-propyl orthoacetate, tri-n-butyl orthoacetate, triethyl orthopropionate, tri-n-propyl orthopropionate, tri-n-butyl orthopropionate, triethyl orthobenzoate, etc., preferably in a reaction medium such as pyridine, etc., and in a molecular ratio of 2:1.

Employing the aforementioned orthoacetate, orthopropionate, orthobenzoate, etc., esters instead of orthoformate esters provide a mechanism for producing trimethine or carbocyanine compounds containing a substitutent such as methyl, ethyl, phenyl, etc., at the central carbon atom or meso position of the trimethinyl chain.

Unsymmetrical trimethine compounds of Formula I wherein $m=2$ and R and $R^1$ and/or Y and $Y^1$ are different, may be prepared by condensing, in the absence of a base, a first cycloammonium quaternary salt of Formula IX with an amidine such as N,N-diphenylformamidine, preferably in a reaction medium such as acetic anhydride to provide a cycloammonium quaternary salt of the formula:

(XI) 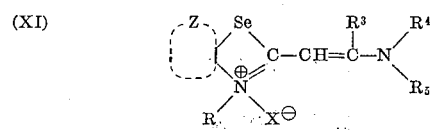

wherein $R^3$ represents hydrogen, a phenyl group, or a lower alkyl group preferably comprising not more than 3 carbon atoms such as methyl, ethyl, or propyl; $R^4$ represents hydrogen, a lower alkyl group such as methyl, ethyl, etc., or a lower acyl group such as acetyl, propionyl, etc., and $R^5$ represents a phenyl group such as phenyl, p-chlorophenyl, p-tolyl, etc., or with an ester of an orthocarboxylic acid to provide a cycloammonium quaternary salt believed to have the formula:

(XII) 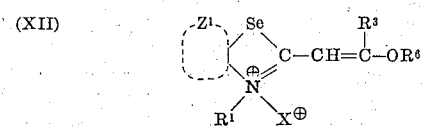

or (XII) 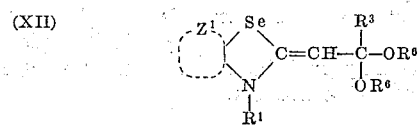

wherein $R^6$ represents an alkyl group and preferably a lower alkyl group such as methyl, ethyl, etc.; and then directly condensing, in the presence of a base, a second cycloammonium quaternary salt of Formula X with either a cycloammonium quaternary salt of Formula (XI). (XII), or (XII'), or the methylene base of Formula XII.

Symmetrical pentamethine compounds of Formula I wherein $m=3$, R and $R^1$ are identical, and Y and $Y^1$ are identical, may be prepared by condensing a cycloammonium quaternary salt of Formula IX, in the presence of a base, with a β-arylaminoacrolein acid salt such as β-anilinoacrolein anil hydrochloride, a 1,1,3-trialkoxy-1-propene or a 1,1,3,3-tetraalkoxypropane, preferably in a molecular ratio of 2:1.

Unsymmetrical pentamethine compounds of Formula I wherein $m=3$, R and $R^1$ and/or Y and $Y^1$ are different, may be prepared by condensing a cycloammonium quaternary salt of Formula IX, in the absence of a base, with a β-arylaminoacrolein anil salt, preferably in a molecular ratio of 1:1 to provide a cycloammonium quaternary salt of the formula:

(XIII) 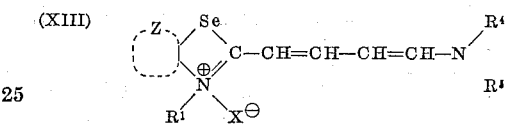

and then directly condensing a second cycloammonium quaternary salt of Formula X with the product in the presence of base.

The invention will be illustrated in greater detail in connection with the following specific examples which set out a representative synthetic procedure employing this invention and a representative utilization of the thus-prepared product, which, however, are not limited to the details set forth and are intended to be illustrative only.

*Example 1*

A carbocyanine sensitizing dye of the formula:

(XIV) 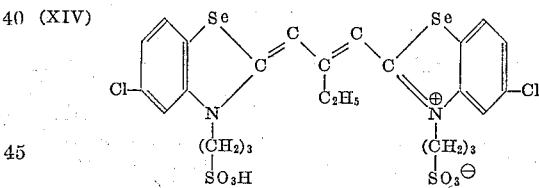

anhydro 5,5'-dichloro-9-ethyl-3,3'-bis-(γ-sulfopropyl)-selenocarbocyanine hydroxide was prepared according to the following sequence of steps.

A mixture comprising 250 grams of p-chloro-o-nitro aniline, 500 cc. of 12 N hydrochloric acid and 250 cc. of methanol was cooled to 0° C. 110 grams of sodium nitrite in 250 cc. of water was slowly added to the mixture. Sodium acetate was added to the mixture until it became alkaline to Congo red. 230 grams of potassium selenocyanate in 500 cc. of water was then added slowly to the mixture at −20 to −30° C. The resultant 4-chloro-2-nitrophenyl selenocyanate, a red-brown precipitate, was separated from the mixture and washed with warm water.

The product was mixed with 4 equivalents of zinc dust and 1000 cc. of water and heated to reflux. Ten equivalents of 50% sodium hydroxide were added slowly and the mixture maintained at reflux for one hour. The resultant sodium salt of p-chloro-o-aminophenylselenol, a brown precipitate, was separated from the mixture.

The product was dissolved in 5% sodium hydroxide. A 3% aqueous hydrogen peroxide solution was added until complete precipitation of the product bis(4-chloro-2-aminophenyl) diselenide, M.P. 135–138° C., was obtained.

32.7 grams of the product was suspended in 200 cc. of acetic acid, and the mixture was chilled to 5° C. Acetyl chloride was added in small increments, care being taken that at no time did the temperature of the reaction mixture exceed about 10° C. Addition of the acetyl chloride was continued until the evolution of heat ceased completely; altogether, the amount of acetyl chloride added represented a 10% excess over the theoretical amount.

The resultant bis(4-chloro-2-aminophenyl) diselenide in suspension was maintained at 5° C. and zinc dust was added in increments in the same manner as the acetyl chloride until the evolution of heat ceased. The mixture was then diluted with ice water and raised to a pH within the range of 8–9 with ammonium hydroxide. The product, 5-chloro-2-methylbenzoselenazole, an off-white solid, was separated from the mixture. The product was purified by dissolving it in a minimum volume of acetone, adding an excess of 48% hydrobromic acid and separating the resultant white precipitate. The precipitated hydrobromide was dissolved in methanol, an excess of 15 N ammonium hydroxide was added, and the mixture diluted with water, causing the selenazole to precipitate. The product was then collected and dried over potassium hydroxide.

10.0 grams of the product was mixed together with 6.36 grams of 1,3-propane sultone, fused by heating, and maintained at 115° C. on an oil bath for approximately 16 hours. The reaction mixture was then ground to a fine powder and washed with acetone and ether.

4.50 grams of the product, 5-chloro-2-methyl-3-(γ-sulfopropyl)-benzoselenazolium betaine, was mixed with 5 grams of phenol and heated to 100° C. until a clear yellow-orange solution was produced. 2.5 cc. of triethyl orthopropionate was added and the temperature increased to 125° C. over a twenty-minute period. When the solution became a clear reddish-brown liquid, 1.8 cc. of triethylamine were added. The resultant magenta colored mixture was cooled to room temperature and the desired product precipitated by the addition of acetone to the mixture. The dye was then separated, washed with acetone, and then with ether.

The yield of selenazole, based on the bis(o-aminophenyl) diselenide in the above procedure, was found to be 80 to 85%.

*Example II*

1.5 cc. of a solution comprising 1 mg. of the product of Example I per cc. of methanol were added, at 38° C., to 7.5 grams of a silver iodobromide emulsion containing 1.0 gram of silver, and the mixture was stirred thoroughly. To the resultant sensitized emulsion were added, with constant stirring, 1.4 cc. of 10% saponin, 1.4 cc. of 10% sodium N-methyl-N-oleyl taurate, and 0.5 cc. of 1% acetic acid. The resultant emulsion was then coated on a gelatin-subcoated cellulose triacetate film base.

The product was then exposed in a wedge spectograph and developed; the resultant wedge spectrogram exhibited the conventional spectral sensitivity pattern indicative of the cyanine dye product.

The following example is given for the purpose of comparing results obtained by the application of the instant invention with those obtained by conventional processes.

*Example III*

4-chloro-2-nitrophenyl selenocyanate was prepared by the method described in Example I. This material was converted to the zinc salt of the corresponding 4-chloro-2-aminoselenophenol by the method described in Bauer, Ber. Deut. Chem., volume 46, Part I, pages 93–94.

To 47.7 grams (0.200 mole) of the thus-prepared material were added 40.8 grams of acetic anhydride, 25 ml. of glacial acetic acid, and about 2 grams of anhydrous sodium acetate. 13.1 grams (0.200 mole) of zinc dust was weighed out, a portion was added to the above solution, and the mixture heated to reflux. Another 41.0 gram portion of acetic anhydride and the remainder of the zinc dust were added, and the entire mixture was refluxed for about one-half hour. After refluxing, the mixture comprised a light yellow solution with a small amount of gray suspended solid. About 2 more grams of sodium acetate were added, and the mixture refluxed for an additional two hours, after which it was cooled to room temperature. 30 ml. of water were added to decompose any excess acetic anhydride. The material was titrated to a pH of 8.5 with a 50% sodium hydroxide solution, resulting in the separation of a dark brown, gummy solid from the clear supernatant liquid. This liquid was steam-distilled, resulting in the separation of an off-white oily material which solidified at room temperature.

The solid was recrystallized from 48% HBr by warming the mixture to 75° C. After recrystallization, the resulting selenazole, as confirmed by analysis, was in the form of fine, colorless needles. Yield, 13.0 grams, about 28%. Attempts to recover additional quantities of the product from the mother liquor resulted only in a negligible second crop.

For the preparation of spectrally sensitized photographic silver halide gelatin emulsions, the sensitizing dyes of Formula I may be added to the emulsion in accordance with customary procedures, that is, by adding a solution of the sensitizing dye in an appropriate solvent to the emulsions. Solvents include water, methanol, ethanol, pyridine, acetone, etc., or mixtures of such solvents. The amount of cyanine sensitizing dye employed may be varied, depending upon the characteristics of the particular silver halide emulsion employed, results desired, etc. In general, from about 5 to 100 mg. of dye per liter of silver halide emulsion is sufficient to obtain maximum sensitization.

Since certain changes may be made in the above process without departing from the scope of the invention herein involved, it is intended that all matter contained in the above description shall be interpreted as illustrative and not in a limiting sense.

What is claimed is:

1. The process for preparing compounds having the formula

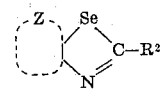

wherein Z represents the nonmetallic atoms necessary to complete a heterocyclic ring system of the benzoselenazole and naphthoselenazole series and $R^2$ represents an alkyl group having 1 to 3 carbon atoms inclusive, which comprises dispersing a diselenide of the formula

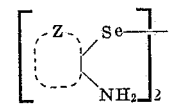

in a polar solvent, chilling the dispersion formed thereby to about 5° C., intermittently adding thereto an acylating agent comprising an acid halide selected from the group consisting of halides of acetic, propionic, butyric, and benzoic acids in small increments, continually chilling the reaction mixture so that the temperature of said mixture at no time exceeds more than about 10 centigrade degrees, and continuing said intermittent addition and chilling until the evolution of heat ceases, to provide compounds from the group consisting of bis(ortho-N-acylaminophenyl) diselenides and bis(ortho-N-acylaminonaphthyl) diselenides; and intermittently adding to the resulting dispersion a reducing agent selected from the group consisting of zinc and tin in small increments, continually chilling the reaction mixture so that the temperature of said mixture at no time exceeds more than about 10 centigrade degrees, and continuing said intermittent addition and chilling until the evolution of heat ceases, to provide the desired selenazoles.

2. The process of preparing 5-chloro-2-methylbenzoselenazole in about 80–85% yields which comprises dispersing di-(p-chloro-o-aminophenylselenide) in acetic acid; chilling the dispersion thereformed to about 5° C.; intermittently adding acetyl chloride to said dispersion in increments and continually chilling the reaction mixture thereformed so that the temperature thereof does not exceed about 10° C.; continuing said intermittent addition and chilling until the evolution of heat ceases; adding zinc to the thus-prepared dispersion of bis(o-acetamido-p-chlorophenyl) diselenide in increments and continually chilling the reaction mixture so that the temperature thereof does not exceed about 10° C.; and continuing said intermittent addition and chilling until the evolution of heat ceases.

References Cited

UNITED STATES PATENTS

| 2,107,379 | 2/1938 | Koslowsky | 260—240.65 X |
| 2,330,791 | 9/1943 | Middleton et al. | 260—240.65 X |
| 2,339,094 | 1/1944 | Middleton et al. | 260—240.65 X |
| 3,177,210 | 11/1962 | Rosenoff | 260—240.65 |

FOREIGN PATENTS 532,405    4/1955   Belgium.

OTHER REFERENCES

Bauer, Ber. Deut. Chem., vol. 46, pages 92 to 98 (1913).

Clark, J. Chem. Soc., 1928, pages 2313 to 2319.

JOHN D. RANDOLPH, *Primary Examiner.*